(12) United States Patent
Kobasa et al.

(10) Patent No.: US 8,012,451 B2
(45) Date of Patent: Sep. 6, 2011

(54) HIGHLY PHOTOSENSITIVE TITANIUM DIOXIDE AND PROCESS FOR FORMING THE SAME

(75) Inventors: Ihor M. Kobasa, Chernivtsi (UA); Wojciech J. Strus, Krakow (PL); Mykhaylo A. Kovbasa, Chortkiv (UA)

(73) Assignee: Worthington Technologies, LLC, Sweetwater, TN (US)

( * ) Notice: Subject to any disclaimer, the term of this patent is extended or adjusted under 35 U.S.C. 154(b) by 0 days.

(21) Appl. No.: 12/519,121

(22) PCT Filed: Dec. 13, 2007

(86) PCT No.: PCT/US2007/025504
§ 371 (c)(1),
(2), (4) Date: Jul. 27, 2010

(87) PCT Pub. No.: WO2008/076308
PCT Pub. Date: Jun. 26, 2008

(65) Prior Publication Data
US 2010/0285955 A1 Nov. 11, 2010

(51) Int. Cl.
*C01G 23/047* (2006.01)
*C01G 23/04* (2006.01)
*B01J 23/00* (2006.01)
(52) U.S. Cl. .................... 423/610; 423/608; 502/350
(58) Field of Classification Search .................. None
See application file for complete search history.

(56) References Cited

U.S. PATENT DOCUMENTS

| | | | | |
|---|---|---|---|---|
| 5,985,020 A | * | 11/1999 | Andes et al. | 106/436 |
| 6,713,038 B2 | * | 3/2004 | Zhou et al. | 423/610 |
| 2006/0191834 A1 | * | 8/2006 | Fuchs et al. | 210/222 |
| 2006/0251563 A1 | * | 11/2006 | Gole | 423/385 |

* cited by examiner

*Primary Examiner* — Emily M Le
*Assistant Examiner* — Sarah A Slifka
(74) *Attorney, Agent, or Firm* — Jetter & Associates, P.A.

(57) ABSTRACT

A highly photosensitivity titanium oxide composition includes a plurality of nanosize particles including titanium dioxide and titanium suboxide. The particles are substantially non-stoichiometric ($TiO_{2-x}$, wherein $0.1 < x < 0.3$ at a surface of the particles, and in the bulk of the particles x is less than at the surface), provide a magnetic susceptibility value (X) of at least $0.8 \cdot 10^{-6}$ cm$^3$/g at 300 K, and are least 30% by weight rutile. A related method of forming a high photosensitivity titanium oxide composition includes the steps of providing a titanium chloride compound, such as titanium tetrachloride, an oxygen-containing gas and hydrogen, wherein a concentration of the hydrogen is in a stoichiometric excess ($H_2:O_2$) from 2.02:1 to 2.61:1. The titanium chloride compound is burned in the presence of oxygen from the oxygen-containing gas and hydrogen to form plurality of ultrafine particles comprising titanium dioxide and titanium suboxide. The method can include the steps prior to the burning step of mixing the titanium chloride compound, oxygen and hydrogen and heating the same to 50 to 100° C., such as from 70-100° C.

16 Claims, 2 Drawing Sheets

HIGHLY PHOTOSENSITIVE TITANIUM DIOXIDE AND PROCESS FOR FORMING THE SAME

BACKGROUND

Titanium dioxide ($TiO_2$), also referred to as titania, is found in three known crystal forms, rutile, anatase and brookite. Anatase and rutile can be used industrially. There are various known methods of synthesis, compositional variants including admixtures, and thermal processing which can modify define the crystalline form(s) obtained.

Titania is the most widely used white pigment for the dye and paint industry, ceramics, paper, rubber, and plastic manufacturing. Titania is also used in the ointment and other cosmetics production, especially for UV protection.

Photocatalytic activity is generally the most important feature of Titania. Photocatalytic reactions do not lead to photocorrosion of the reagents and their composition remains unchanged unlike photochemical reactions, where semiconducting reagents undergo photocorrosion. Photochemical reagents absorb light and promote reactions between various substances in gaseous or liquid phases, or induce electrical current. Many semiconductors (including titania) exhibit such kind of photochemical activity. Semiconducting photocatalysis is a complex phenomenon with numerous promising spectro-optical, thermodynamic, kinetic, electrophysical and some other fundamental prospects. For instance, titania can be used as a basic material for the highly effective photocatalytic systems for transformation, conservation and utilization of the solar energy and for the hazardous waste neutralization and for other environment preservation solutions. Titania products also bring good prospects for the low-tonnage chemistry, for design and production of multi-functional materials (for example, materials containing thin-precipitated layer of nano-particles on various substrates), for production of the optical sensors and materials with non-linear optical properties.

These reasons promote numerous photocatalytic investigations. There has been reported water decomposition, which occurs on the surface of titania and produces ecologically friendly molecular hydrogen which can be used as a fuel. There are many successful investigation projects in the field of photocatalysis, as well as many surveys and general works. However, very low quantum yield of most photocatalytic systems is a serious shortcoming, which limits potential applications.

Simple photocatalytic semiconducting system includes donor (D) and acceptor (A) parts acting on the photocatalyst (e.g. titania). A closed photocatalytic loop can generally work only if acceptor accepts the excited electron from the conduction band ($e^-+A \rightarrow A^-$) and the hole would transfer to donor ($h^++D \rightarrow D^+$) after photogeneration of the electron-hole couple

$$(TiO_2) \xrightarrow{h\nu} e^- + h^+).$$

Further transformation of the intermediates $A^-$ and $D^+$ can run even without light and photocatalyst. Energetic properties of the photocatalytic system should correspond to each other. The electron-hole reactions can run if they are thermodynamically allowed, e.g. potential of the conductivity band should be more negative than the oxidation potential of D ($E_{CB}<E_A^{red}$ and $E_{VB}>E_D^{ox}$). Efficiency of reactions $e^-+A \rightarrow A^-$ and $h^++D \rightarrow D^+$ (and the photocatalytic process itself) should rise as the gaps $\Delta E_{red}=E_A^{red}-E_{CB}$ and $\Delta E_{ox}=E_{VB}-E_D^{ox}$ widen.

The photogenerated electrons and holes can recombine. The recombination process competes with the above mentioned redox scheme and significantly lowers efficiency of any semiconducting photocatalyst (including titania). Therefore, photocatalytic systems are preferably modified (e.g. by insertion of the electrons and holes carriers, deposition of metals or metal oxides on semiconductors, using double-semiconductor heterostructures) to reduce recombination.

Titania can be obtained either in the crystalline or hydrated form through various methods and from various source compounds. Hydrolysis of the aqueous solutions of Ti(IV), hydrolysis of vapor or aerosol, thermodecomposition of alcoholates or coordination compounds of Ti(IV), and high temperature hydrolysis of $TiCl_4$ are the most widely used methods for titania production. There are many industrial methods for titania production.

Titania can be used as a light-sensitive component for photo-layers and dielectric materials or as a photocatalyst for some redox reactions. Such compounds generally provide high photocatalytic activity and dispersibility.

Most industrial samples of titania comprise coarsely dispersed particles with low photocatalytic activity. There are some methods of production of fine disperse titania with reasonably high photosensitivity. However, such methods are generally inconvenient and laborious.

There is a method of production of superfine titanium dioxide disclosed in U.K. Patent 1052896 which discloses burning of titanium tetrachloride (preliminary heated up to 350° C.) in the gas mixture, which contains oxygen (or carbon dioxide) and hydrogen at 1200-1400° C. Oxygen content in the gas mixture is disclosed to be slightly stoichiometrically excessive relative to the hydrogen content in the gas mixture. In this way, the rutile type of fine titanium dioxide is obtained. However, the photosensitivity of the resulting product is very low and its specific photocatalytic activity (determined through the reaction of the methylene blue reduction) is only about $2.5-3.0 \times 10^{-5}$ mg/ml·min·m² at room temperature.

SUMMARY

A high photosensitivity titanium oxide composition comprises a plurality of nanosize particles comprising titanium dioxide and titanium suboxide. The composition of the particles is substantially non-stoichiometric and the composition provides a magnetic susceptibility value ($\chi$) of at least $0.8 \cdot 10^{-6}$ cm³/g at 300 K, and is generally at least 30% by weight rutile. As used herein, "substantially non-stoichiometric $TiO_2$" comprises $TiO_{2-x}$, wherein $0.1<x<0.3$ at a surface of the particles, and in the bulk of the particles x is less than at the surface.

In one embodiment $\chi$ is between $0.8 \times 10^{-6}$ cm³/g and $2.4 \times 10^{-6}$ cm³/g at 300 K. The average size of the particles is generally 10-40 nm, such as 10 to 20 nm. In one embodiment, rutile comprises at least 40% of the composition, with the balance of the composition being essentially all anatase, such as 45 to 55% rutile and the balance anatase.

The chlorine concentration at a surface of the particles is less than a chlorine concentration in a bulk of the particles, generally being at least an order of magnitude less than the chlorine concentration in the bulk of the particles. The x value at the surface of the particles can be from $0.15<x<0.3$ and x in the bulk of the particles can be $<0.1$, such as from 0.08 to 0.1.

A photocatalytic activity of the particles can be 1.4-3.0 mg/ml·min·m² as measured by the methylene blue reduction reaction at room temperature.

A method of forming a high photosensitivity titanium oxide composition comprises the steps of providing a titanium chloride compound, such as titanium trichloride or titanium tetrachloride, and an oxygen-containing gas (e.g. air) and hydrogen, wherein a concentration of hydrogen is in a stoichiometric excess ($H_2$:$O_2$) from 2.02:1 to 2.61:1, such as 2.12:1, 2.22:1, 2.32:1, 2.42:1 or 2.52:1. The titanium chloride compound is burned in the presence of oxygen from the oxygen-containing gas and hydrogen to form plurality of ultrafine particles comprising titanium dioxide and titanium suboxide. The method can include the steps prior to the burning step of mixing the titanium chloride compound, the oxygen and hydrogen, and heating the titanium chloride compound, oxygen and hydrogen to 50 to 100° C., such as from 70-100° C.

The steady state temperature during the burning step is generally from 700 to 1100° C., such as 800° C., 850° C., 900° C., 950° C., 1000° C., or 1050° C. The method can further comprise the step of steaming the particles at 150-220° C. to promote desorption of chlorine from the surface of the particles, such as in a temperature range from 170-200° C.

A molar ratio of the titanium tetrachloride compound to $H_2$ is generally in a range from 1:4 to 1:2. A median size of the particles is generally in the range from 10-40 nm (agglomerated), while individual primary particles are generally 2-8 nm in size. The photocatalytic activity of the particles can be from 1.4-3.0 mg/ml·min·m² as measured in the reaction of methylene blue reduction at room temperature (300 K).

DESCRIPTION OF THE DRAWINGS

A fuller understanding of the present invention and the features and benefits thereof will be obtained upon review of the following detailed description together with the accompanying drawings, in which.

DETAILED DESCRIPTION OF THE INVENTION

A method of forming a high photosensitivity titanium oxide composition comprises the steps of providing a titanium chloride compound, such as titanium trichloride or titanium tetrachloride, an oxygen-containing gas (e.g. air) and hydrogen ($H_2$). The concentration of hydrogen is in a stoichiometric excess ($H_2$:$O_2$) from 2.02:1 to 2.61:1. The titanium chloride compound is burned in the presence of oxygen from the oxygen-containing gas and the hydrogen to form a plurality of ultrafine (nanoscale) particles. The particles comprise titanium dioxide and titanium suboxide, but are referred to herein as "$TiO_2$ comprising particles according to the invention" or "the inventive composition" for simple reference. The resulting $TiO_2$ comprising particles according to the invention provide a magnetic susceptibility value ($\chi$) of at least $0.8 \cdot 10^{-6}$ cm³/g at 300 K and are at least 30% by weight rutile, with the balance being essentially anatase. $\chi$ can be between $0.8 \times 10^{-6}$ cm³/g and $2.4 \times 10^{-6}$ cm³/g at 300 K. The very high paramagnetic susceptibility of the inventive composition is an indicator of its high photocatalytic activity, such as a room temperate photosensitivity of 1.4-3.0 mg/ml·min·m², which is several orders of magnitude greater than the photosensitivity provided by conventional industrial titania pigment product (2.5-3.0·$10^{-5}$ mg/ml·min·m² at room temperature).

The oxygen-containing gas, such as air, is generally preliminary dried and heated, such as to 70-100° C. The burning process generally occurs in a temperature range from at 700-1100° C. The flame hydrolysis temperature (700-1100° C.) generally defines both hydrolysis rate and structure of the final product. The process rate significantly slows down and the hydrolysis generally does not finish at a temperature lower than 700° C., which has been found to lower the photocatalytic activity of the product. On other hand, an optimal ratio between anatase and rutile forms shifts towards the rutile form at the temperature higher than 1100° C., which has been found by the present Inventors to unfavorably influence the specific surface area and photocatalytic activity of the final product. The final product can undergo a steam treatment at 170-200° C.

Reaction conditions govern the composition of the final product, its photocatalytic activity, and its crystalline nature (anatase or rutile or their mixture), which can be obtained by shifting temperature, ratio between source components, or by adding admixtures about 0.001-3.0 mass % selected from W(VI), V(V), Bi(III), Al(III), Zn(II), Zr(IV), Hf(IV) compounds. Reaction conditions are essentially unchanged whether $TiCl_3$ or $TiCl_4$ is utilized as the titanium source compound.

Figure 1:
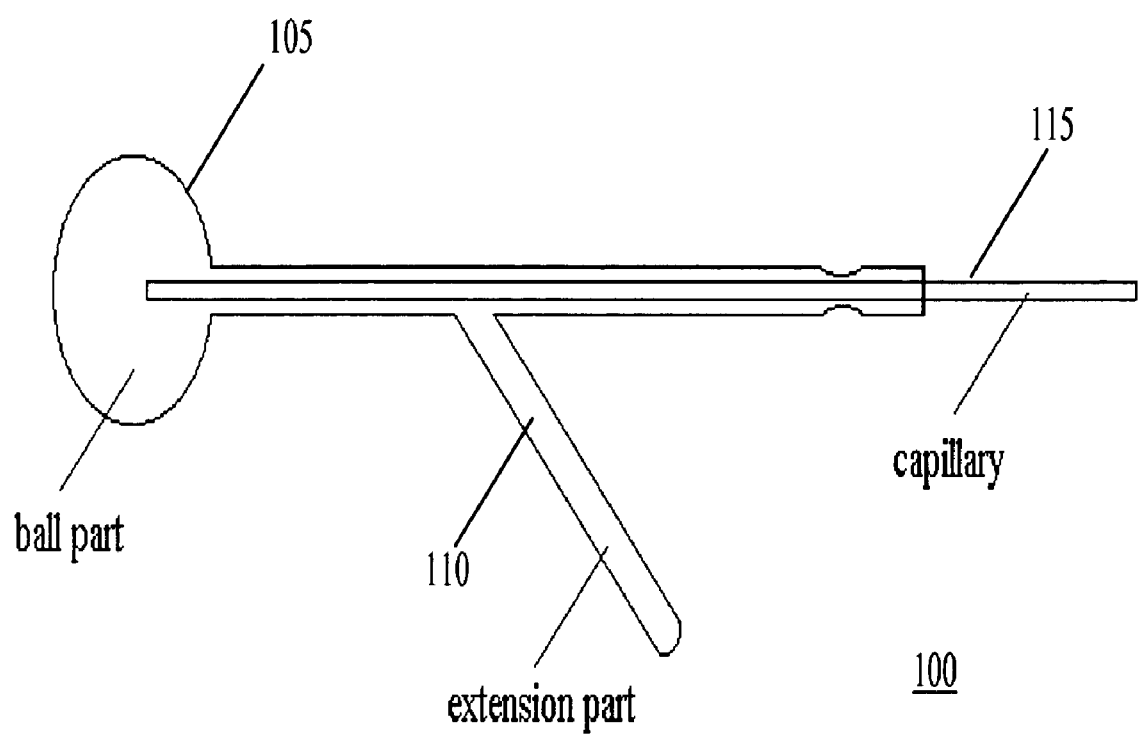
FIG. 1 shows a ball-extension quartz ampoule that was used by the inventors to measure photocatalytic activity of $TiO_2$ comprising particles according to the invention.

FIG. 1 shows a special ball-extension quartz ampoule 100 that was used by the Inventors to measure photocatalytic activity of the inventive composition. In a typical experiment, 16 mg of the inventive composition is loaded in the ball part of the ampoule 105 and 0.6 ml of the methylene blue solution with a concentration of 0.2 g/l together with 0.6 ml of 38% formaldehyde solution are placed in the extension part 110. A capillary 115 is inserted into the ampoule and an oxygen-free inert gas (argon or nitrogen) is pumped the through the capillary 115 until the oxygen content lowers to below $4.0 \cdot 10^{-5}$ vol. %. Then the ampoule 100 is sealed and placed in such a manner to mix the inventive composition with the solutions. The mixture is stirred mechanically and irradiated by a lamp (not shown), such as a mercury lamp which provides ultraviolet radiation with a peak typically at 310-400 nm. The distance between the ball part 105 and the lamp is generally about 20 cm. The measured time for the complete discoloring of the reaction mixture is measured. The shorter the time elapsed until discoloring, the higher photocatalytic activity revealed in the $TiO_2$ comprising sample.

As described herein, photocatalytic activity is calculated using the following formula:

$$A_{sp} = \frac{c_0 1000}{\tau_{1/2} Sm},$$

where
$c_0$—initial concentration of methylene blue (mg/ml);
$\tau_{1/2}$—time of semi-discoloring, min;
S—specific surface area, m²/g (measured by BET method);
m—mass of $TiO_2$ comprising sample, mg.

This experimental method can also be used for measuring the photocatalytic activity of the inventive composition when embodied as composites comprising the inventive composition and other oxide materials or polymers.

Figure 2:
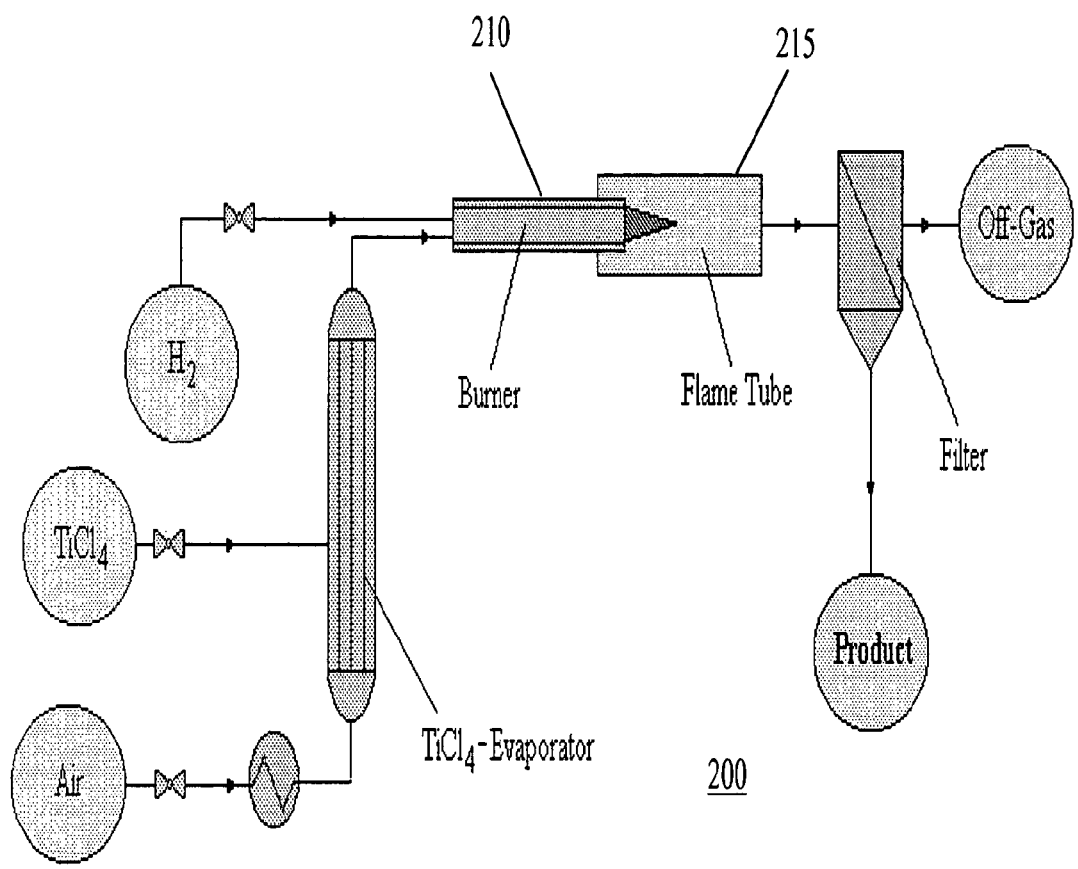
FIG. 2 shows a simplified reactor apparatus that can be used to produce titanium oxide particles according to the invention.

FIG. 2 shows a simplified reactor apparatus 200 that can be used to produce particles having the inventive. Source materials include an oxygen comprising gas such as air, hydrogen, and titanium tetrachloride as the titanium chloride compound. The source materials are generally heated up to 70-100° C. and piped to the burner/combustion chamber 210, where they mix with each other, wherein a stoichiometric excess of $H_2$ is provided. They are then piped at the laminar mode from the orifice to flame tube 215 where the air-hydrogen mixture burns at 700-1100° C. causing hydrolysis of titanium tetrachloride:

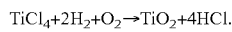

$$TiCl_4 + 2H_2 + O_2 \rightarrow TiO_2 + 4HCl.$$

Primary particles of titanium dioxide are formed in this reaction. Primary particles are generally 2 to 8 nm in size.

Another process can also co-run:

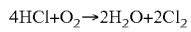

$$4HCl + O_2 \rightarrow 2H_2O + Cl_2$$

Secondary particles of $TiO_2$ comprising material according to the invention are finally formed as agglomerates in the coagulator. Agglomerated size is generally 10 to 40 nm. This final product can also be steamed at 170-200° C. to remove surface adsorbed chlorine.

Superfine pyrogenic $TiO_2$ comprising particles having a non-stoichiometric composition is the final product of the inventive process. The inventive composition obtained as a mixture of two various crystalline modifications, anatase and rutile. This causes high defectiveness of the material, which generally leads to high paramagnetic susceptibility and photosensitivity. X-ray analysis performed by the present Inventors has evidenced that the resulting product is a mixture of separate particles of anatase and separate particles of rutile. However, it is possible that a very small percentage of the particles may include mixed anatase and rutile.

The process should generally be kept within designated temperature range. The mixture of $TiCl_4$ (or $TiCl_3$) and other reactant gases are best kept homogeneous at 70-100° C. This condition ensures homogeneity and fine dispersion (small particle size) of the flame hydrolysis product. $TiCl_4$ vapor does not reach needful concentration at the temperature lower than 70° C., which causes lower homogeneity of the product. A temperature higher than 100° C. can cause formation of large lumps in the final product.

Heating up to 70-100° C. helps avoid condensation of $TiCl_4$ vapor during piping. The heating also promotes keeping of the reacting mixture more stable and uniform. The temperature of the reacting mixture is preferably higher than boiling point of the titanium chloride compound, such as for example 140° C. for $TiCl_4$ (boiling point of ~138° C.). Thus, $TiCl_a$ should generally be added to the transportation air in evaporator at the temperature, which prevents condensation of $TiCl_4$ vapor (for instance, at 70-100° C.). The pipe between evaporator and burner should also be heated to avoid the vapor condensation inside. If the condensation occurs, new liquid-drop phase appears in the gas mixture, which can significantly change the burning process regime. This change generally leads to obtaining coarse- and polydisperse titania powder.

The flame hydrolysis should generally be kept within 700-1100° C. because the process runs too slow at the temperature lower than 700° C. and reaction of hydrolysisoxidation does not finish, which significantly lower photosensitivity of the product. On other hand, the ratio between anatase and rutile phases shifts away from optimal value at the temperature higher than 1100° C., which causes lowering of the specific surface area and photosensitivity of the product. The flame hydrolysis temperature can be measured using a thermocouple detector.

The ratio of $TiCl_4$ (or $TiCl_3$) and $H_2$ is generally within a range from 1:4 to 1:2. Hydrogen excess above this range is generally unfavorable because it causes extra consumption of hydrogen and does not generally provide any significant improvement of dispersibility and photocatalytic activity of $TiO_2$. Hydrogen deficit below this range generally causes worse dispersibility and reduction of photocatalytic activity of $TiO_2$.

Steam processing at the temperature lower than 150° C. also generally lowers the photosensitivity of the product while processing at the temperature higher than 200° C. does not generally give any significant rise of photosensitivity but requires extra energy consumption.

Steam processing of $TiO_2$ comprising powder according to the invention is generally a helpful step. Steaming helps eliminate "acid" gases (~0.1-0.15 mass % of $HCl$, $Cl_2$), which can get adsorbed on the surface of the $TiO_2$ comprising particles. $TiO_2$ and steam are very affine, which makes possible effective elimination (high temperature desorption) of $HCl$ and $Cl_2$ from the surface of $TiO_2$. $TiO_2$ comprising products can be steamed with the air, which was preliminary moistened by the distilled water vapor at 400° C.

Titania powder product can also be treated with steam in a "boiling bed" apparatus. The "boiling bed" is formed by an inert gas (nitrogen) flux in the heated quartz pipes mounted in the cylinder vertical apparatus. The steam treatment temperature should not be higher than 690-700° C. since higher temperature can lower photocatalytic activity and dispersibility of the product.

Various modifications of titania according to the invention (anatase, rutile or their mixture of various ratios between anatase and rutile) can be obtained by shifting the reaction conditions (temperature, ratio between the source compounds, etc.). Physical and chemical properties of these modifications are given in the Table 1 shown below.

TABLE 1

Physico-chemical properties of $TiO_2$ comprising particles according to the invention

| Property | Unit | Typical Value |
| --- | --- | --- |
| Specific surface area (BET) DIN 66131 | $m^2/g$ | 60 ± 15 |
| Particles size TEM | Nm | 10-20 |
| Filling weight DIN ISO 787/1X | g/l | 110-140 |
| pH DIN ISO 787/1X | | 3-4 |
| Weight loss after calcination (2 hours at 1000° C.) | % | <0.8 |
| Whiteness | Units | 94-97 |
| $SiO_2$ content | % | 0.1 |
| $Fe_2O_3$ content | % | <0.004 |
| $TiO_2$ content | % | >99.9 |
| Specific photocatalytic activity (measured in the reaction of reduction of methylene blue) | $mg/(ml \cdot min \cdot m^2)$ | 1.4-3.0 |

EXAMPLES

It should be understood that the Examples described below are provided for illustrative purposes only and do not in any way define the scope of the invention.

In the framework of the present invention, titania according to the invention can be produced in the continuous process according to the following scheme.

Dry air is being heated up to 70-100° C. and saturated with $TiCl_4$ vapor. This saturation can be realized in the surface evaporator with heated $TiCl_4$. Then the mixture is being mixed with hydrogen and then piped to the burning device. This process produces $TiO_2$, which passes through the steam processing.

Example 1

100 $Nm^3$/hr of air was dried and heated to 100° C., then mixed with 100 l/hr of $TiCl_4$ and 40 $Nm^3$/hr of hydrogen and piped to the burning device. The burning took place at 1100° C. and the product was processed with water vapor at 180° C. The photosensitivity of the product obtained was determined through the reaction of the methylene blue reduction. The product consisted of 0.01-0.02 μm particles with a specific surface of 80 $m^2$/g and photocatalytic activity of 3.0 mg/ml·min·$m^2$.

Example 2

100 $Nm^3$/hr of the air was dried and heated to 70° C., then mixed with 100 l/hr of $TiCl_4$ and 40 $Nm^3$/hr of hydrogen and piped to the burning device. The burning took place at 1100° C. and the product was processed with water vapor at 200° C. The resulting $TiO_2$ product had a specific surface area of 80 $m^2$/g and photocatalytic activity of 2.9 mg/ml·min·$m^2$.

Example 3

100 $Nm^3$/hr air was dried and heated to 100° C., then mixed with 50 l/hr of $TiCl_4$ and 40 $Nm^3$/hr of hydrogen and piped to the burning device. The burning took place at 700° C. and the product was then processed with the water vapor at 200° C. The resulting $TiO_2$ product had a specific surface of 50 $m^2$/g and photocatalytic activity of 2.0 mg/ml min $m^{-2}$.

Example 4

$TiO_2$ comprising product obtained as in example 3, was processed with the water vapor at 150° C. The resulting $TiO_2$ comprising product had specific surface area of 50 $m^2$/g and photocatalytic activity of 0.9 mg/ml·min·$m^2$.

Based on the experimental data presented, $TiO_2$ comprising particles according to the invention can be seen to provide significantly higher photocatalytic activity as compared to available or otherwise known titania compositions. Higher photosensitivity allows improved performance in a variety of applications, including, but not limited to, as a photocatalyst for various redox processes, for manufacturing of photo materials, in the framework of additive technology of the printed boards production and in a variety of other applications.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. A high photosensitivity titanium oxide composition, comprising:
   a plurality of nanosize particles comprising titanium dioxide and titanium suboxide,
   said particles being substantially non-stoichiometric having a magnetic susceptibility value (X) of at least $0.8 \times 10^{-6}$ $cm^3$/g at 300 K and being at least 30% by weight rutile.

2. The composition of claim 1, wherein said X is between $0.8 \times 10^{-6}$ $cm^3$/g and $2.4 \times 10^{-6}$ $cm^3$g at 300 K.

3. The composition of claim 1, wherein an average size of said particles is 10-40 nm.

4. The composition of claim 1, wherein said rutile is at least 40%, and a balance of said composition comprises anatase.

5. The composition of claim 4, wherein said composition comprises 45 to 55% of said rutile, said anatase comprising the balance.

6. The composition of claim 1, which further comprises chlorine, wherein the chlorine concentration at a surface of said particles is less than a chlorine concentration in a bulk portion of said particles.

7. The composition of claim 6, wherein said chlorine concentration at said surface of said particles is at least an order of magnitude less than said chlorine concentration in said bulk of said particles.

8. The composition of claim 1, wherein said composition comprises $TiO_{2-x}$, wherein 0.15 <x<0.3 at a surface of said particles, and less than x in a bulk of said particles.

9. The composition of claim 8, wherein said x in said bulk of said particles is <0.1.

10. The composition of claim 8, wherein said x in said bulk of said particles is from 0.08 to 0.1.

11. The composition of claim 1, wherein a photocatalytic activity of said particles is 1.4-3.0 mg/ml·min·$m^2$ as measured in the reaction of methylene blue reduction.

12. A high photosensitivity titanium oxide composition comprising a plurality of nanosize particles comprising titanium dioxide and titanium suboxide, said particles being substantially non-stoichiometric having a magnetic susceptibility value (X) of at least $0.8 \times 10^{-6}$ $cm^3$/gm at 300 K and being at least 30% by weight rutile, formed from a process comprising the steps of:
   providing a titanium chloride comprising compound, an oxygen-containing gas and hydrogen, wherein a concentration of said hydrogen is in a stoichiometric excess ($H_2:O_2$) from 2.02: 1 to 2.61: 1, and
   burning said titanium chloride comprising compound at a steady state temperature from 700 to 1100 ° C. in the presence of oxygen from said oxygen-containing gas and said hydrogen to form plurality of ultrafine particles comprising titanium dioxide and titanium suboxide.

13. The composition of claim 12, further comprising the step of steaming said particles at 150-220 ° C. to promote desorption of chlorine from the surface of said particles.

14. The composition of claim 12, wherein a molar ratio of said titanium chloride comprising compound to said $H_2$ is in a range from 1:4 to 1:2.

15. The composition of claim 12, further comprising the steps, prior to said burning step, of mixing said titanium chloride comprising compound, said oxygen and hydrogen; and heating said titanium chloride comprising compound, said oxygen and hydrogen to 70-100° C.

16. The composition of claim 1, wherein said composition includes <0.1 wt % silica.

* * * * *